United States Patent [19]

Konzorr

[11] Patent Number: 4,628,763
[45] Date of Patent: Dec. 16, 1986

[54] BICYCLE PEDAL AND STIRRUP THEREFOR

[75] Inventor: Hubert Konzorr, Froendenberg, Fed. Rep. of Germany

[73] Assignee: Union Sils, Van de Loo & Co. GmbH, Froendenberg, Fed. Rep. of Germany

[21] Appl. No.: 590,873

[22] Filed: Mar. 19, 1984

[30] Foreign Application Priority Data

Sep. 19, 1983 [DE] Fed. Rep. of Germany ............. 148
Oct. 19, 1983 [DE] Fed. Rep. of Germany ....... 3337927

[51] Int. Cl.⁶ ............................................. G05G 1/14
[52] U.S. Cl. ................................................ 74/594.6
[58] Field of Search ................ 74/594.6, 594.4, 594.5, 74/560, 563, 562; 36/131, 132; 280/11.3, 613

[56] References Cited

U.S. PATENT DOCUMENTS

| | | | |
|---|---|---|---|
| 3,382,734 | 5/1968 | Hussey | 74/594.4 |
| 3,388,613 | 6/1968 | Seward | 74/562 |
| 3,592,076 | 7/1971 | Baginski | 74/594.5 |
| 3,812,606 | 5/1974 | Merola | 36/131 |
| 4,302,987 | 12/1981 | Takeda | 74/594.6 |

FOREIGN PATENT DOCUMENTS

| | | | |
|---|---|---|---|
| 2617257 | 1/1977 | Fed. Rep. of Germany | 36/132 |
| 435925 | 3/1912 | France | 74/594.6 |
| 558880 | 9/1923 | France | 74/594.6 |
| 17509 | of 1891 | United Kingdom | 74/594.6 |
| 21706 | of 1901 | United Kingdom | 74/594.6 |
| 17262 | of 1908 | United Kingdom | 74/594.6 |
| 2099382 | 12/1982 | United Kingdom | 74/594.6 |

*Primary Examiner*—Gary L. Smith
*Assistant Examiner*—Vinh Luong
*Attorney, Agent, or Firm*—Sherman and Shalloway

[57] ABSTRACT

A pedal for a bicycle with a foot-holding stirrup which extends over the forward area of a foot placed onto the upper side of the pedal and the ends of which are connected to the pedal. In the pedal, the foot-holding stirrup extends to the underside of the pedal and has ends bent upwards which may be introduced into plug openings formed in the underside of the pedal. This construction decreases costs and makes possible an adjustable attachment of the foot-holding stirrup to the pedal.

8 Claims, 2 Drawing Figures

BICYCLE PEDAL AND STIRRUP THEREFOR

BACKGROUND OF THE INVENTION

This invention relates to a bicycle pedal with a holding stirrup for the foot which extends over the forward area of a foot or shoe placed on the upper side of the pedal and the ends of which are connected with the pedal.

Foot-holding stirrups for the pedal of a bicycle are known in various developments. In the prior art, the ends of the foot-holding stirrup have always been attached at the inside and the outside of the pedal. The attachment is accomplished generally in the form of a fixed connection, for example, with screws or rivets. Foot-holding stirrups connected to the pedal in this manner generally do not offer the possibility of an adaptation concerning their size and their relative position as compared to the pedal. Also, the production of the known foot-holding stirrups is relatively expensive and attachment to the pedal quite difficult.

SUMMARY OF THE INVENTION

It is the main object of the present invention to create a bicycle pedal of particularly simple construction on which a foot-holding stirrup is attachable with greater ease than is known in the prior art.

In solving the deficiencies in the prior art, the proposal is made according to the present invention to extend the foot-holding stirrup toward the underside of the pedal, with the ends of the foot-holding stirrup bending upwards to form pegs which are introducable into plug openings formed on the underside of the pedal.

In this way, it is no longer required to attach the foot-holding stirrup with the help of screws or rivets or by welding it onto the pedal. Although the foot-holding stirrup, according to the present invention, must assume considerable stresses, attachment of the stirrup to the pedal in this manner is sufficient, for when the foot is pushed in under the foot-holding stirrup, the stirrup is also biased in the upward direction and thus is held by the foot itself in such a manner that the peg-like ends thereof cannot leave the plug openings. Since the peg-like ends of the stirrup provide good stability in attachment to the pedal, the production and mounting costs are lowered considerably. This stability will be sufficient whenever the relation between the dimensions of the pegs and the dimension of the plug openings in the pedal are related so that the stirrup is held by an interference fit alone.

According to the invention, it will be advantageous to form the stirrup of a stiff wire. The stirrup so made will always be sufficiently resiliently elastic so that it may adapt itself to at least a slight extent to the shape of the foot. At the same time, the ends of the stirrup may be moved by hand toward each other to such an extent that the pegs thereof may be adjusted at least to a slight degree to the separation distance of the plug opening. The elastic characteristic of the stirrup furthermore supports the retention of the pegs in the plug openings.

According to the invention, it is advantageous to have the exterior surfaces of the pegs of the stirrup roughened or at least provided with one stop cam. The roughening increases the friction between the pegs and the plug openings. If need be, the latter may also be developed as a component of a lenticulation, whenever the pegs are designed correspondingly and are provided, for example, with a cam suitable for this purpose.

According to the invention, it is also possible to make the pedal of plastic in its area serving for the attachment of the stirrup and to provide each peg with at least one claw hooking into the wall of the assigned plug opening.

In a further object of the invention, the pedal may be provided in the inside and outside marginal areas of its underside with several plug openings. The pegs of the foot holding stirrup may then be inserted in variable pairs of plug openings. As a result of this structure, it will become possible to adapt the position of the foot-holding stirrup as compared to the pedal to the pertinent shape of the respective foot. In this connection, it will be advantageous that the plug openings be displaced in relation to one another in a direction running at an angle to the longitudinal axis of the pedal in such a way that the forward plug openings have a lesser distance from one another than the rear plug openings. As a result of this structure, the adaptability of the foot-holding stirrup to differently shaped feet will be improved further.

According to an advantageous further object of the present invention, the plug openings may be provided at least approximately in that area of the pedal in which the pad of a foot is located which is to be placed on the pedal. In this case, the foot-holding stirrup attains a particularly favorable position as compared to the pedal and the foot when placed onto the pedal.

A good seating of the holding stirrup on the pedal will be ensured according to the invention also through the fact that the parts of the foot-holding stirrup adjacent the pegs run adjacent the pedal for a distance in the direction toward the front of the pedal. A transfer of force between the foot-holding stirrup and the pedal may not only take place in this case in the area of the pegs but also in the area of the underside of the pedal.

Generally speaking, a bicycle pedal is formed of rectangularly shaped longitudinal and cross bridges, with at least the longitudinal bridges being metallic. The cross bridges in many instances are made of plastic or hard rubber and form at the same time a slip resistant supporting surface for the foot. For the proper attachment for the foot of the foot-holding stirrup developed according to the invention, in most cases an attachment of it at the two sides of the pedal extending in a longitudinal direction thereof will be effective. Locating the plug openings at these points is possible according to the present invention in a particularly simple manner, whenever the pedal is made of a solid synthetic substance material and, starting out from a cross bridge across the pedal axis, forms a frame shaped like an arc running in the direction toward the front of the pedal, the topside of which frame is flattened and is developed as a supporting surface and the underside of which is provided with plug openings.

This completely novel shape of the pedal has numerous advantages. Making the pedal of synthetic substance makes possible a particularly simple attachment of the plug openings, for example, in the form of corresponding bores at places favorable for the attachment of the foot-holding stirrup. Furthermore, the pedal may be produced essentially in one piece, for during its producing, the cross bridge with its bearing and as crossing the pedal axis, may be molded on. The upper side of the pedal offers a supporting surface for the foot of relatively great width and may be provided with a roughening in a simple manner or with attached rough surfaces, in order to ensure a good slip resistance. Moreover, the pedal is less sharp-edged than a pedal produced from metallic parts, so that it will be difficult to injure oneself on the pedal.

Subsequently, a particular preferred embodiment of the invention will be described in more detail on the basis of the accompanying drawing figures.

Figure 1:
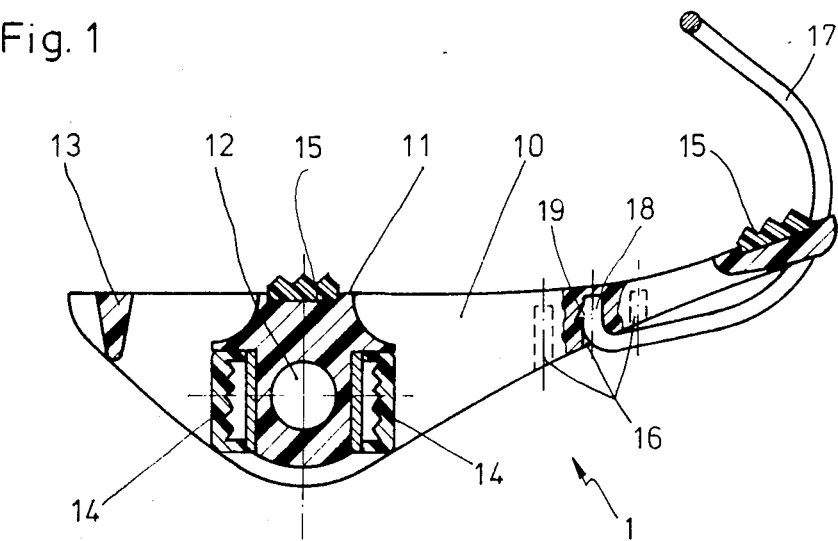
FIG. 1 shows a longitudinal cross section through a pedal along the line 1—1 of FIG. 2.

As shown in the figures, the pedal 1 is made of plastic in one piece and in its forward area it forms a frame 10 running in the shape of an arc, which is connected at the sides by a cross link 11. The cross link 11 has a hollow space into which a pedal axle 12 is inserted and this hollow space integrally includes a bearing. The hollow space is closed toward the outside of the pedal, so that the outside is smooth. The rear ends of the frame 10 are connected by a bridge 13. Viewed laterally, the frame 10 in the area of the pedal axle 12 or of the cross link 11 is drawn to the rear to such an extent that the front side and the rear side of the cross link 11 may serve for the attachment of at least two reflectors 14. Since the forward part of the frame 10 runs tapered somewhat in the upward direction, the forward reflector 14 is well visible. The bridge 13 extends for only a brief stretch downwards so that the visibility of the rear reflector 14 will likewise not be impeded. These reflectors 14 may, if desired, be made of plastic.

The topside of the frame 10 is flat and constitutes a supporting surface for the foot. Onto the topside of the frame 10, foot-gripping pedal pads 15 are glued, the upper side of which is strongly notched or riffled and forms small knobs which prevent any slipping of the foot with respect thereto. The pads 15 may be made of rubber or plastic.

In the inside and outside marginal areas on the underside of the frame 10, three plug openings 16 are provided, for example, which lie in a manner corresponding to the course of the frame 10 in a direction inclined to the longitudinal axis of the pedal. The separation of the most forward respective inside and outside plug openings 16 is less than the separation of the respective pairs of inside and outside plug openings lying behind that.

A foot-holding stirrup 17 is shaped of a stiff wire and at the ends it is bent away upwards to form pegs 18. Each peg has a claw 19 pointing downwards which, upon introduction of the peg 18, will hook itself to the synthetic material in one of the plug openings 16. A removal of the foot-holding stirrup 17 nevertheless remains possible although the claw 19 resists unintentional removal of the stirrup 17.

Figure 2:
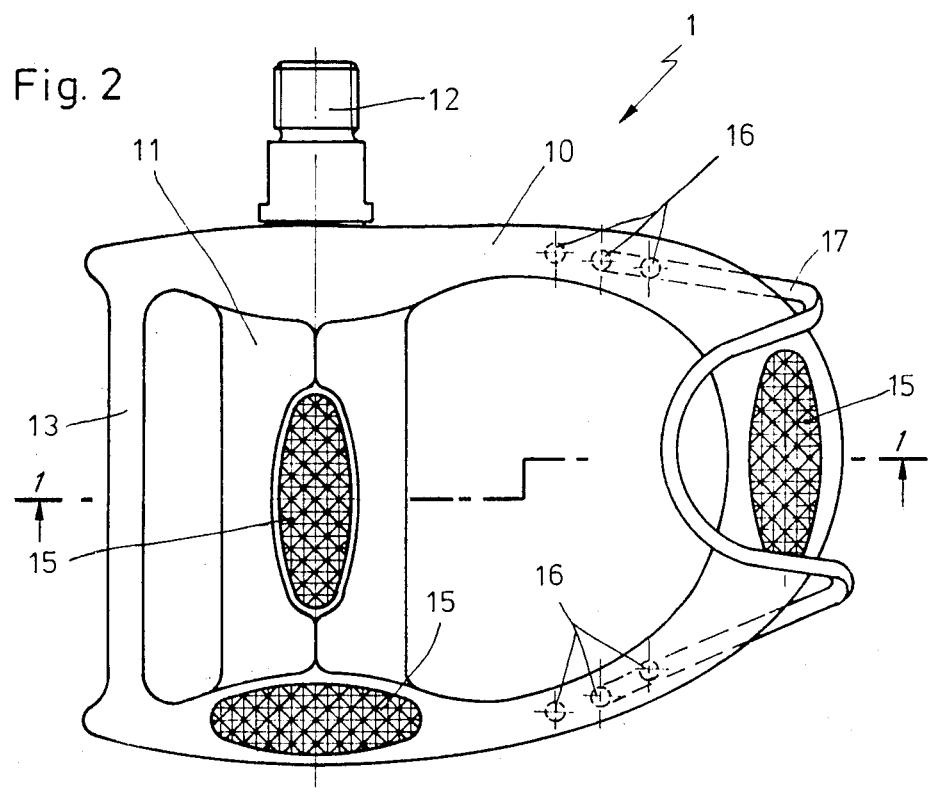
FIG. 2 shows a top view of the pedal.

The parts of the foot-holding stirrup 17 following the peg 18 run at first for a stretch along the underside of the frame 10 as clearly seen in FIG. 1 before they pass over in an arch-like course into the upper part of the foot-holding stirrup 17 as clearly seen in FIG. 2. Whenever the foot is pushed underneath the foot-holding stirrup 17, its upper part is slightly pulled upwards in a biasing manner. When this occurs, the foot-holding stirrup 17 at least at those places where it crosses the edges of the frame 10, comes to fit snugly against the underside of said frame.

As FIG. 2 shows, the foot-holding stirrup 17 may be attached in a rearward, in a middle or in a forward position due to the three openings 16 on each side of the pedal 1. As a result of this, an adaptation of the stirrup to feet of different lengths is possible.

Various changes and modification of the present invention may become apparent to those skilled in the art and, as such, it is intended that the invention only be limited by the scope of the appended claims.

I claim:

1. A pedal for bicycle including a stirrup for holding a foot which extends over a forward area of said foot when placed on an upper side of said pedal and said stirrup having ends which are connected with said pedal characterized in that said foot-holding stirrup extends around said pedal to an underside portion of the pedal and in that said stirrup ends of said foot-holding stirrup are bent upwardly and form pegs which are introduced into plug openings located on said underside portion of said pedal and said plug openings extending only partially through said pedal, the pegs and plug openings forming the sole means retaining said stirrup on said pedal further wherein said pedal is made of plastic, at least in a region thereof provided for the attachment of said foot-holding stirrup and in that each said peg is provided with at least one claw adapted to hook into a wall of the respective plug opening into which said peg is inserted, said at least one claw being adapted to hook the plastic material in the respective plug opening to aid in retaining each said peg therein.

2. The pedal of claim 1, characterized in that the foot-holding stirrup is formed by stiff wire.

3. The pedal of either claim 1 or 2, characterized in that said pegs are roughened to enhance retention thereof in said plug openings.

4. The pedal of claim 1, characterized in that in inside and the outside marginal areas of its underside, said pedal is provided with a plurality of said plug openings.

5. The pedal of claim 4, characterized in that said plug openings are displaced in a direction running at an acute angle to a longitudinal axis of said pedal whereby inside and outside pairs of plug openings located at a forward location on said pedal have a lesser distance from one another than inside and outside pairs of plug openings located at a rearward location on said pedal.

6. The pedal of claim 1, characterized in that said plug openings are provided at least approximately in that area of said pedal in which a foot pad mounted onto said pedal is located.

7. The pedal of claim 1, characterized in that parts of said foot-holding stirrup adjacent said pegs run on said underside portion of said pedal in a direction toward a forwardmost portion of said pedal.

8. The pedal of claim 1, made of a solid plastic substance and, starting out from a cross bridge receiving a pedal axle, forms a frame running in the shape of an arc toward a forward portion of said pedal, said upper side of said pedal being flattened and providing a supporting surface for said foot.

* * * * *